United States Patent
Liu et al.

(10) Patent No.: US 11,113,172 B2
(45) Date of Patent: Sep. 7, 2021

(54) METHOD, TERMINAL, AND COMPUTER-READABLE STORAGE MEDIUM FOR DISPLAYING ACTIVITY RECORD INFORMATION

(71) Applicant: BEIJING XIAOMI MOBILE SOFTWARE CO., LTD., Beijing (CN)

(72) Inventors: Bo Liu, Beijing (CN); Chao Tang, Beijing (CN); Tong Qin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 53 days.

(21) Appl. No.: 15/991,025

(22) Filed: May 29, 2018

(65) Prior Publication Data

US 2018/0341568 A1    Nov. 29, 2018

(30) Foreign Application Priority Data

May 27, 2017    (CN) .......................... 201710393072.0

(51) Int. Cl.
*G06F 11/34*    (2006.01)
*G06F 16/80*    (2019.01)
(Continued)

(52) U.S. Cl.
CPC .......... *G06F 11/3438* (2013.01); *G06F 16/80* (2019.01); *G06F 16/958* (2019.01);
(Continued)

(58) Field of Classification Search
CPC .......................... H04L 67/22; H04M 1/72566; G06F 11/3438; G06Q 10/1091
See application file for complete search history.

(56) References Cited

U.S. PATENT DOCUMENTS 9,696,971 B1 *    7/2017    Wierda ...................... G06F 8/41
2001/0056435 A1    12/2001    Quick
(Continued)

FOREIGN PATENT DOCUMENTS

CN    1845495 A    10/2006
CN    105989146 A    10/2016
(Continued)

OTHER PUBLICATIONS

European Extended Search Report issued in corresponding EP Patent Application No. 18174347.7, dated Jul. 26, 2018, 10 pages.
(Continued)

*Primary Examiner* — El Hadji M Sall
(74) *Attorney, Agent, or Firm* — Arch & Lake LLP

(57) ABSTRACT

A method, terminal and computer-readable storage medium are provided for displaying activity record information. The method includes: acquiring specified activity record information after switching to a specified interface; and displaying the specified activity record information in the specified interface. In the present disclosure, after the specified activity record information is obtained by an operating system from extracting and integrating the activity record information of at least one application installed in the terminal, the specified activity record information may be displayed in a specified interface. Since the specified activity record information may come from at least one application in the terminal, the activity record information scattered in various applications may be displayed in the specified interface.

19 Claims, 14 Drawing Sheets

(51) Int. Cl.
*G06F 16/958* (2019.01)
*H04M 1/72451* (2021.01)
*G06Q 10/10* (2012.01)
*H04L 29/08* (2006.01)

(52) U.S. Cl.
CPC ......... *G06Q 10/1091* (2013.01); *H04L 67/22* (2013.01); *H04M 1/72451* (2021.01)

(56) References Cited

U.S. PATENT DOCUMENTS

| | | |
|---|---|---|
| 2002/0082900 A1 | 6/2002 | Johnson |
| 2006/0253776 A1 | 11/2006 | Ohkawa |
| 2010/0083095 A1 | 4/2010 | Nikovski |
| 2013/0085854 A1* | 4/2013 | Masuko ............. G06Q 30/0601 705/14.53 |
| 2013/0311875 A1* | 11/2013 | Pappas ................ G06F 17/2247 715/234 |
| 2016/0140525 A1* | 5/2016 | Ferreira da Silva .......................... G06Q 20/102 705/43 |
| 2016/0283591 A1* | 9/2016 | Eun ...................... G06F 16/958 |

FOREIGN PATENT DOCUMENTS

| | | |
|---|---|---|
| CN | 106339938 A | 1/2017 |
| CN | 106372110 A | 2/2017 |
| CN | 106445947 A | 2/2017 |
| CN | 106469392 A | 3/2017 |
| CN | 106528390 A | 3/2017 |
| CN | 106686063 A | 5/2017 |

OTHER PUBLICATIONS

First Office Action issued to Chinese Application No. 201710393072. 0, dated Mar. 20, 2020 with English translation, (12p).

Notification to grant patent right for invention of Chinese application No. 20171039307.2 dated Nov. 18, 2020, 8 pages.

Lai Lawrence W.C., et al; Repeated planning applications by developers under statutory zoning: A Hong Kong case study of delays and design improvements in provate residential development; Land Use Policy 57, Jun. 15, 2016, pp. 1-3.

Guangyuan Zhang, Analysis on the Characteristics and Reasons of Banks' Development of E-commerce Business; Times Finance, No. 7, Jul. 20, 2016, pp. 84 and 87.

* cited by examiner

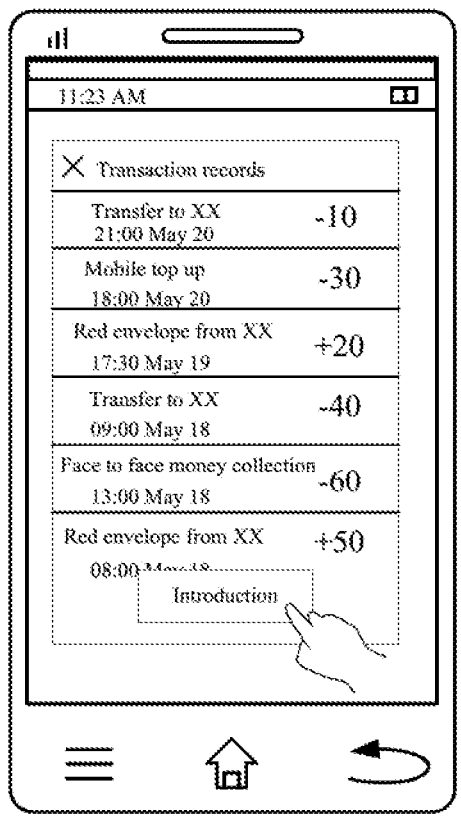

Fig. 4B

```
┌─────────────────────────────────────────────────────┐
│ the terminal extracts and integrates the transaction record information │ ⟵ 501
│ from at least one installed application to obtain the specified         │
│                transaction record information                           │
└─────────────────────────────────────────────────────┘
                            │
                            ▼
┌─────────────────────────────────────────────────────┐
│ the terminal displays the specified transaction record information in   │ ⟵ 502
│   the specified interface after switching to the specified interface    │
└─────────────────────────────────────────────────────┘
```

Fig. 5A

METHOD, TERMINAL, AND COMPUTER-READABLE STORAGE MEDIUM FOR DISPLAYING ACTIVITY RECORD INFORMATION

CROSS-REFERENCE TO RELATED APPLICATION

This application claims priority to Chinese Patent Application No. 201710393072.0, filed with the State Intellectual Property Office on May 27, 2017, the entire contents of which are incorporated herein by reference.

TECHNICAL FIELD

The present disclosure relates to internet technologies, and more particularly to a method, terminal, and computer-readable storage medium for displaying activity record information.

BACKGROUND

Nowadays, for the convenience of user to be aware of his physical health, financial situation, or other aspect of his activities in a preset time period, the user may use the terminal to record all sorts of activities. For example, when a user finishes a physical exercise or completes a business trip, the application will generate corresponding activity record information for the user. Where, the activity record information may include activity time and/or other activity details.

Associated with the practical scenario, a user may frequently check the activity record information in order to get a summary for his/her own record. For example, for an application with the activity tracking function, when a user checks the activity record information, he may need to at least execute several steps, such as, click the application icon→click the virtual button to enter his personal homepage→bring up the activity statement in the personal homepage. The terminal may display the activity record information through the application. The procedure of displaying the activity record information no doubt is very complex, time-consuming, and labor-intensive. Therefore, how to display the activity record information becomes particularly important. In other words, nowadays, how to display the activity record information becomes an issue that those who are skilled in the art would pay close attention to.

SUMMARY

In order to solve the problem in the related art, the present disclosure provides a method, terminal and computer-readable storage medium for displaying activity record information. The technical solutions are as follows:

According to a first aspect of the present disclosure, there is provided a method for displaying activity record information. The method may include: acquiring specified activity record information after switching to a specified interface; and displaying the specified activity record information in the specified interface; where the specified activity record information is obtained by a terminal from extracting and integrating the activity record information of at least one application installed in the terminal.

According to a second aspect of the present disclosure, there is provided a device for displaying activity record information. The device may include: an acquisition module configured to acquire specified activity record information after switching to a specified interface; and a display module configured to display the specified activity record information in the specified interface; and where the specified activity record information is obtained by a terminal from extracting and integrating the activity record information of at least one application installed in the terminal.

According to a third aspect of the present disclosure, there is provided a terminal. The terminal may include: a processor; and a memory configured to store executable instructions executed by the processor; wherein the processor is configured to: acquire specified activity record information after switching to a specified interface; and display the specified activity record information in the specified interface; wherein the specified activity record information is obtained by a terminal m from extracting and integrating the activity record information of at least one application installed in the terminal.

According to a fourth aspect of the present disclosure, there is provided a computer-readable storage medium storing computer program instructions that, when executed by a processor, cause the processor to perform the following method: acquiring specified activity record information after switching to a specified interface; and displaying the specified activity record information in the specified interface; where the specified activity record information is obtained by a terminal from extracting and integrating the activity record information of at least one application installed in the terminal.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the present disclosure.

FIG. 4B is a schematic diagram of acquiring an introduction instruction shown in accordance with an example;

FIG. 5A is a flow chart of a method for displaying activity record information shown in accordance with an example;

DETAILED DESCRIPTION

The present disclosure will be described in further detail with reference to the enclosed drawings, to clearly present the objects, technique solutions, and advantages of the present disclosure. Illustrative examples and descriptions thereof serve to explain the present disclosure and are not intended to limit the present disclosure.

The examples of the present disclosure provide a method, terminal, and computer-readable for displaying activity record information. Associated with the accompanying drawings the present disclosure will be described in detail hereafter.

Before the detailed description of the examples of the present disclosure, some terms in the present disclosure are briefly introduced in advance.

Figure 1A:
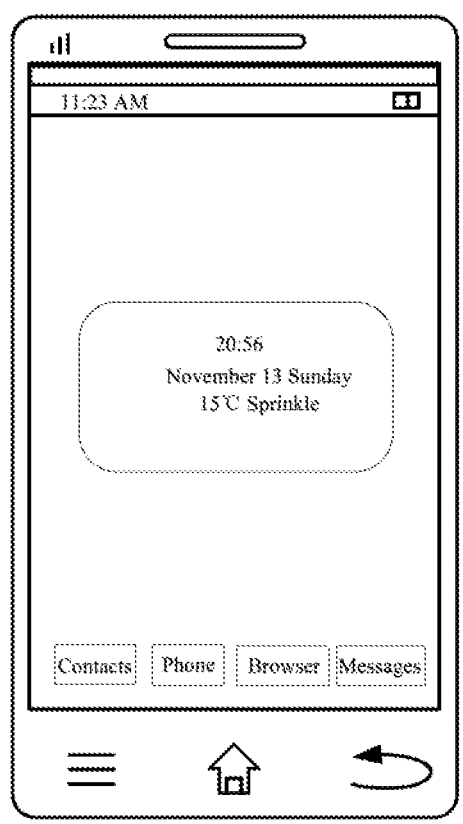
FIG. 1A is a schematic diagram of a main screen interface shown in accordance with an example.
Figure 1B:
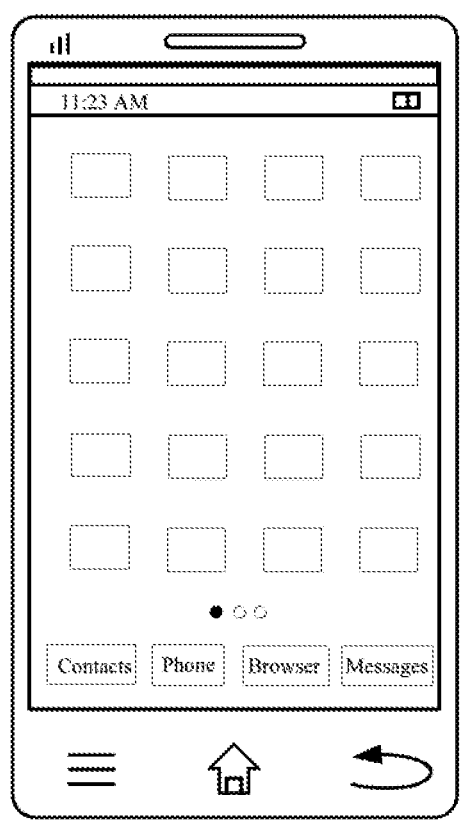
FIG. 1B is a schematic diagram of an application interface shown in accordance with an example.
Figure 1C:
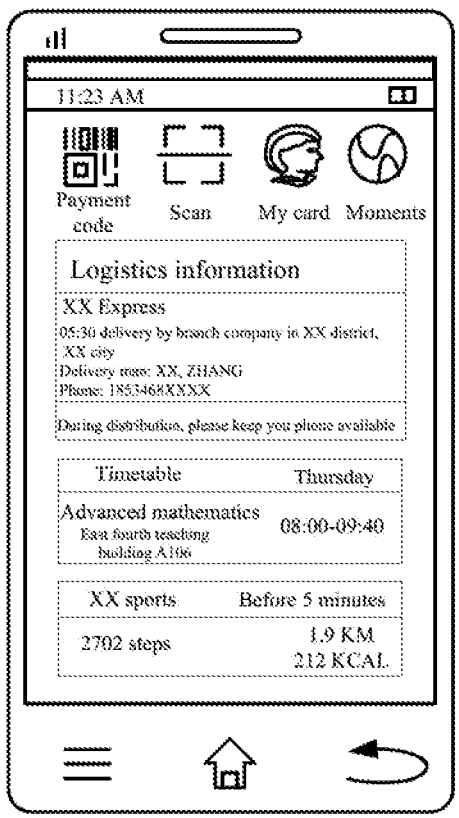
FIG. 1C is a schematic diagram of a hiboard interface shown in accordance with an example.

Specified interface: it may refer to the functional interfaces other than the main screen interface as shown in FIG. 1A and the application interface to display installed applications as shown in FIG. 1B, which is a hiboard interface. Where, the hiboard interface usually is a leftmost functional interface among all the functional interfaces on the terminal screen. Swiping right cross the main screen interface can bring up the hiboard interface on the terminal screen. As shown in 1C, currently the content displayed on the hiboard interface usually is summarized into three big categories. The first category is convenient entrance, the second category is instant suggestion, and the third category is status attention.

In this disclosure, the activity may include one or more of the following activities: spending activity, sports activity, reading activity, entertainment activity, and travel activity. The user may select which activity to record in the user settings. For example, when the user is interested in the consumption situation, after a user completes a money transfer transaction through a financial application, the financial application will notify the user of the activity record information. For example, when a user triggers a transaction through an application with transaction function, the application will generate corresponding activity record information for the user after the transaction is completed. Here, the activity record information may include transaction time, transaction value, etc.

Associated with the practical scenario, a user may frequently check the activity record information in order to get his consumption situation in time. For example, for an application with the transaction function, when a user checks the activity record information, he may need to at least execute several steps, such as, click the application icon→click the virtual button to enter his personal homepage→bring up the transaction statement in the personal homepage. The terminal may display the activity record information through the application. The procedure of displaying the activity record information no doubt is very complex, time-consuming, and labor-intensive. Therefore, how to display the activity record information becomes particularly important. In other words, nowadays, how to display the activity record information becomes an issue that those who are skilled in the art would pay close attention to.

Here, the convenient entrance aggregates the direct entrances for all types of applications or functions, for example, code scan for payment entrance. It helps users skip the complex steps that users usually need to go through to look for applications or functions by applying the recommended algorithms or the application's functions directly, which helps users use the terminal more effectively without any concerns. Instant suggestion usually is closely related to user's current situation. When some conditions are satisfied (time, location, actions in the application, etc.), instant suggestion provides users with valuable and timely content. For example, it may include travel suggestion, delivery tracking, music and radio, train ticket, fight ticket, group buying vulture, movie ticket, weather forecast, daily greeting, agenda alert, etc. Status attention provides experience like little desktop tools, such as flow statistics or sports information, etc.

The examples of the present disclosure provide a method, terminal, and computer-readable for displaying activity record information. The examples of the present disclosure will be described in detail hereafter with reference to the accompanying drawings.

Figure 1D:
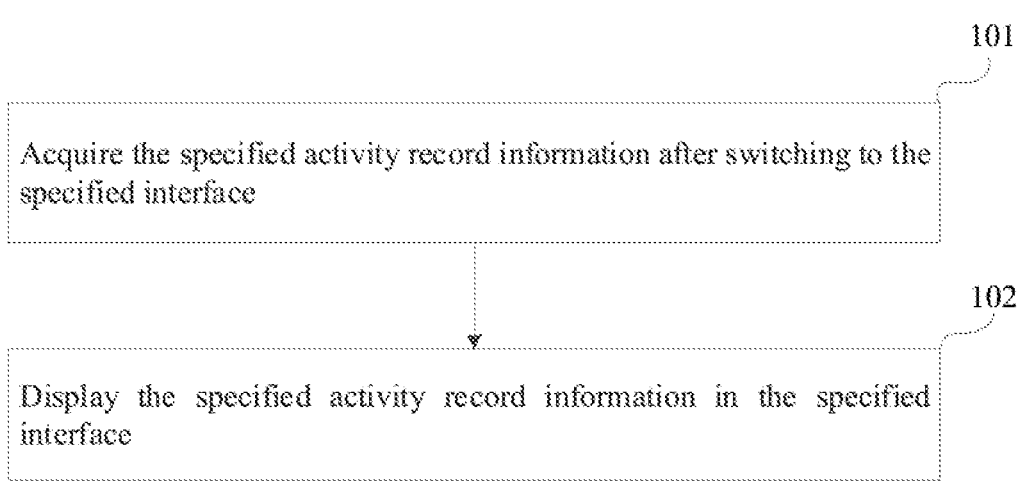
FIG. 1D is a flow chart of a method for acquiring activity record information shown in accordance with an example.

FIG. 1D is a flow chart of a method for displaying activity record information shown in accordance with an example. As shown in FIG. 1D, the following steps are included:

In step 101, after switching to the specified interface, the specified activity record information is acquired. For example, the terminal may include a hiboard interface as the specified interface. The terminal may receive a user selection indicating which activity category the user is interested and display a summary of the selected activity in the hiboard interface.

In step 102, the specified activity record information is displayed in the specified interface. The terminal may track each activity in each activity category by extracting activity information from each application in the terminal. At the end of each day or each week, the terminal may integrate the tracked activities in each activity category so that the user may see the integrated summary report in the hiboard at any time. To save phone battery, the terminal may only perform the integration process when the phone is plugged into a power supply at night.

With the method provided by the example of the present disclosure, after the specified activity record information is acquired by extracting and integrating the activity record information of at least one application installed in the terminal, the specified activity record information may be displayed through the specified interface. Since the specified activity record information may come from one or more applications as long as they are in the same activity category, the activity record information in the same activity category scattered in each application may be displayed through the specified interface. A user does not need to look up the activity record information in each application respectively, which may prevent any activity record information from missing. It is convenient to arrange and aggregate all kinds of activity record information so that the user may make more informed decision or planning in the future.

In some implementations, the specified activity record information at least includes users in the activity and other activity details. For example, when the activity involves a transaction, the activity details may include a transaction value, a transaction time, and a transaction name, and the specified activity record information records a latest happened transaction.

In some implementations, before the specified activity record information is acquired, the method may further include: determining at least one piece of activity record information, each of the at least one piece of activity record information records a transaction happening within a specified period of time; acquiring the transaction value of each of the at least one piece of activity record information; and calculating a summation of at least one obtained transaction value as the specified activity record information.

In some implementations, displaying the specified activity record information in the specified interface includes: displaying a transaction card in the specified interface, wherein the specified activity record information is displayed in an item of information on the transaction card.

In some implementations, the method may further include: acquiring a show-detail instruction, where the show-detail instruction instructs to display details of the activity record information; and displaying a plurality of activity record information in items of information in a transaction time order from the latest to the earliest, as a response to the show-detail instruction.

In some implementations, the method may further include: displaying other activity record information other than the plurality of activity record information in a scrolling manner in the transaction time order from the latest to the earliest, when a slide operation has been detected.

In some implementations, the method may further include: acquiring an information deletion instruction, wherein the information deletion instruction instructs to delete any of the plurality of activity record information; and deleting the activity record information as a response to the information deletion instruction. For example, the terminal may delete the activity record information in the specified interface. Alternatively or additionally, the terminal may further delete the activity record information in the corresponding application after receiving the information deletion instruction.

In some implementations, the method may further include: acquiring an information modification instruction, wherein the information modification instruction instructs to modify any of the plurality of activity record information; displaying the activity record information in a modifiable way as a response to the information modification instruction; and acquiring modification information of the activity record information and updating the activity record information in accordance with the modification information.

In some implementations, the method may further include: acquiring an information addition instruction, where the information addition instruction instructs to add activity record information; displaying an input interface as a response to the information addition instruction; and acquiring input information in the input interface, generating newly added activity record information in accordance with the input information, and displaying the newly added activity record information in the specified interface.

All of the selectable technique solutions described above, may be selected in any combination to form alternative examples of the present disclosure, and will not be described again herein.

As described above, in the example of the present disclosure, the abovementioned status attention is extended by adding a desktop tool with activity management function. For example, the desktop tool may be an icon, an option, a card, a floating cartoon and the like on the desktop. The desktop tool may be referred as a virtual assistant. In one example of the present disclosure, an application with the activity record information management function, which may be called a financial assistant, a bookkeeping assistant, a statement card, a statement manager, etc., is installed for the convenience of user to be aware of his consumption situation.

Here, the activity category may include financial activity, sports activity, reading activity, entertainment activity, travel activity, etc. When the activity category is financial activity, the virtual assistant may be a financial assistant having many functions, including but are not limited to acquiring activity record information scattered in each financial application, catching the activity record information of the current transaction, acquiring activity record information of historical transactions, and centrally displaying, aggregating and managing all kinds of activity record information. For how the financial assistant obtains the activity record information, the example of the present disclosure provides several methods described in the first to the third aspect. For how the financial assistant displays the activity record information, the example of the present disclosure provides the method described in the fourth aspect.

In the first aspect, the example of the present disclosure provides a method for acquiring activity record information through document object model (DOM) structure.

By adopting this method, several scenarios below with complex operation and low efficiency can be effectively prevented from happening: First, a user needs to manually manage and record every piece of activity record information since the activity record information cannot be exported and duplicated. Second, due to numerous activity record information, workload becomes huge when the activity record information is recorded item by item and the efficiency to acquire the activity record information is low. Third, since the activity record information is scattered on the statement list page in each application, when a piece of activity record information is looked up, the user may forget which application's statement list page the activity record information is on and therefore need to traverse each application for lookup. Meanwhile, switching back and forth among the statement list pages of different applications also increases the running load of the terminal and is complex.

Figure 2A:
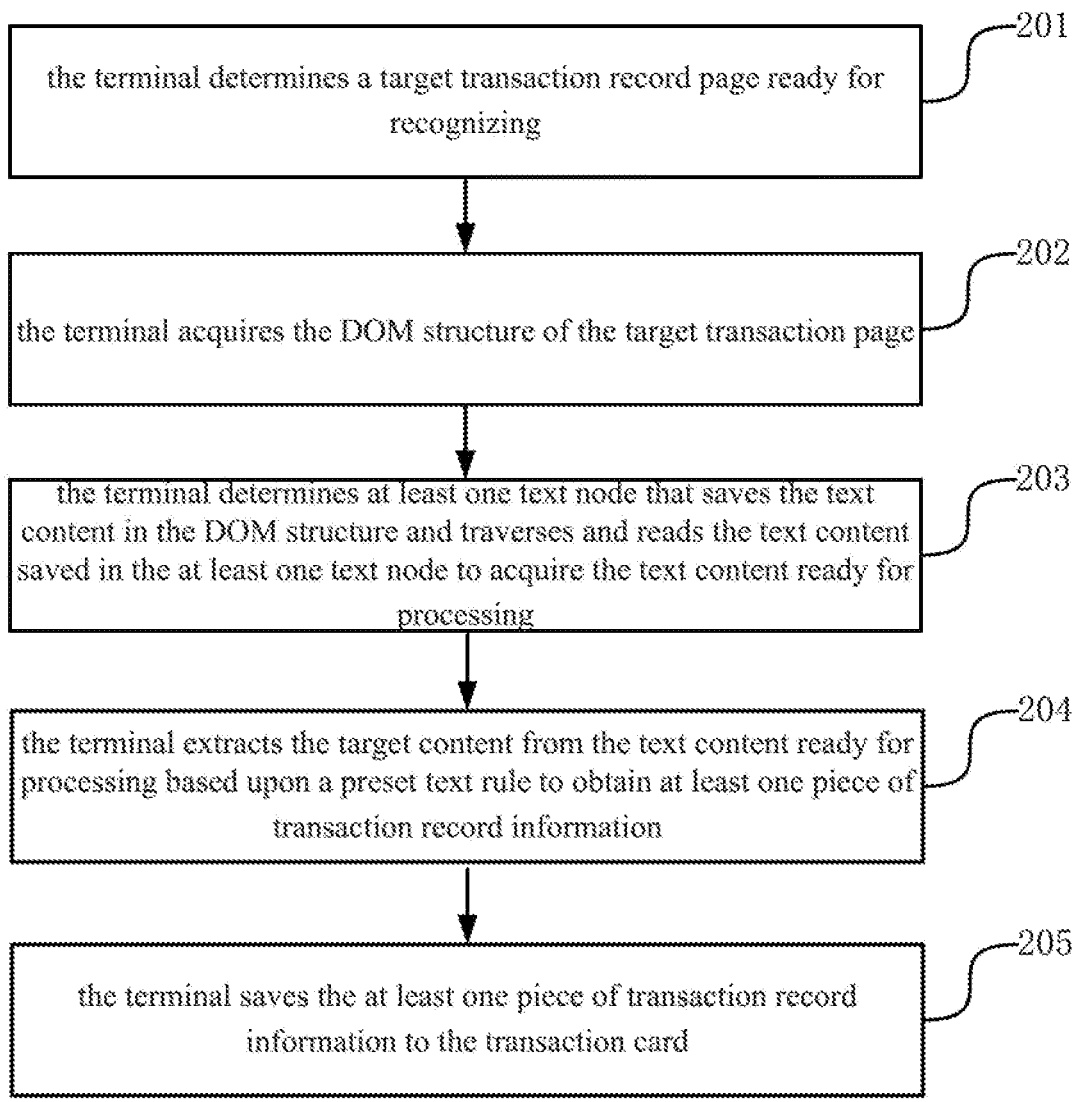
FIG. 2A is a flow chart of a method for acquiring activity record information shown in accordance with an example.

Referring to FIG. 2A, it shows a flow chart of a method for acquiring activity record information through a DOM structure. This method is performed by a terminal, such as the operating system or an application in the terminal. The application may be an application coming with the terminal or a third-party application, which may further be an application granted with the permission to manage the terminal. The method may include the following steps.

In step 201, the terminal determines the target transaction page ready for recognizing.

In daily life, different kinds of applications can be installed in the terminal, including third party applications and applications that come with the terminal. Applications may be categorized based on their functions. For a financial application, a user can trigger an operation for money transfer in the application and then the terminal may transfer user's money to other users based upon the operation to complete the transaction. Here, the terminal may be a mobile phone, a computer, etc. The operation may be payment, receivables, etc. The transaction may be purchase, transfer, checkout, meal ordering, red envelope receiving, red envelope giving out, etc. Of course, it may also be an event in an online payment situation. The transaction is one type of activity when the activity category is financial activity. A person having ordinary skill in the art would appreciate that other types of activity may also be monitored and displayed by the terminal.

After the transaction is completed, the application will generate activity record information for the transaction. Where, the activity record information at least includes a transaction value, a transaction time, and a transaction name. For example, the transaction value may be 100 CNY, the transaction time may be 20:30, and the transaction name may be "food and beverage". Certainly, the activity record information may also include other information, for example, transaction object. Here, the transaction object may be the seller's or the buyer's logo, for example, a store's name, a user's profile photo, etc.

Figure 2B:
FIG. 2B is a schematic diagram of a transaction page shown in accordance with an example.

In some examples, in order to notify a user of whether the transaction is successful and the user's current consumption situation, the application may also display a transaction page that includes the activity record information as shown in FIG. 2B.

Since the transaction page contains activity record information, in the examples of the present, the terminal may monitor the page and determine whether the current display page is the transaction page. When the current display page is determined to be the transaction page, the current display page may be determined as the target transaction page such that the activity record information may be extracted from the target transaction page.

In one or more embodiments, for the procedure of determining whether the current display page is the transaction page, the terminal may compare the specified address link information of the current display page with the address link information of at least one pre-saved page. If the specified address link information matches up with the address link formation of any transaction page of the at least one transaction page, the current display page may be determined to be the target transaction page. Where, the address link information may be a Uniform Resource Locator (URL).

For how the terminal obtains the address link information of at least one transaction page, at least one transaction page from a financial application may be manually collected in advance, the address link information of the at least one saved transaction page is determined, and at least one piece of address link information is preset in the terminal.

For example, the at least one pre-saved transaction page may include a transaction page 1 displayed after a successful checkout through an XX wallet application, a transaction page 2 displayed after a meal ordering payment through an XX take-out application, a transaction page 3 displayed after red envelope giving out to friends through an XX social networking application, and a transaction page 4 displayed after purchase of game props through an XX game application. The terminal pre-saves the address link information A of the transaction page 1, the address link information B of the transaction page 2, the address link information C of the transaction page 3, and the address link information D of the transaction page 4. When any page is displayed, the terminal may compare the address link information of the current display page with (A B, C, D). Then, when the transaction page 1 is displayed after a successful checkout through the XX wallet application, the specified address link information that the terminal obtains is A and the current display page is determined to be the target transaction page.

Figure 2C:
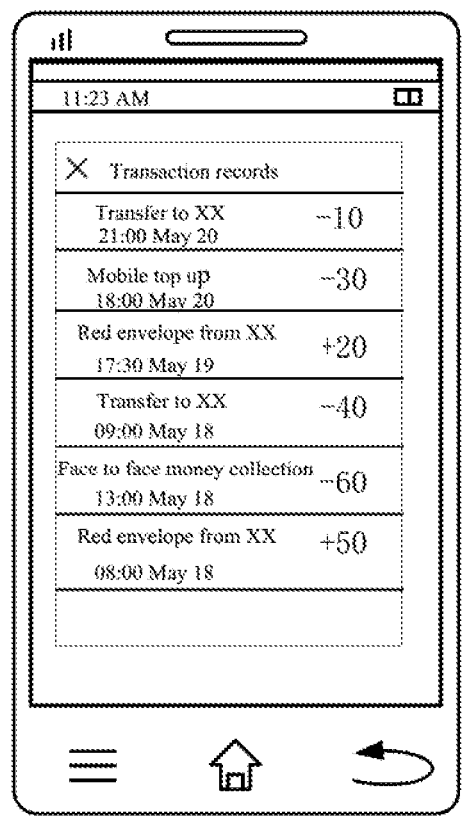
FIG. 2C is a schematic diagram of a transaction page shown in accordance with an example.

During the procedure of determining the above transaction page, the target transaction page is a generated transaction page according to the current transaction. In some implementations, the target transaction page may also be a historical activity record page generated based upon at least one historical transaction, i.e., a statement list page. FIG. 2C shows an example of the historical activity record page.

Where, when the application generates activity record information, it may save the generated activity record information as a historical activity record information and display the historical activity record information through a historical activity record page. Where, the historical activity record page includes at least one piece of historical activity record information. In the example of the present disclosure, the terminal may also determine the historical activity record page as the target transaction page ready for recognizing such that the historical activity record information may be extracted from the historical activity record page.

For the abovementioned situation, the terminal may obtain an information introduction instruction, and display at least one installed application as a response to the information introduction instruction. After obtaining a selected instruction for any of the at least one application, the operating system displays the historical activity record page of the selected application as a response to the selected instruction and determines the historical activity record page as the target transaction page.

The specified page may be the interface of a financial assistant application. Additionally, when the financial assistant application is displayed in the specified interface in form of transaction card and when a user selects the show-detail option in the transaction card, the terminal may obtain a show-detail instruction and switch to the specified page. That is, the specified page may be a display page after the show-detail instruction is obtained from the transaction card, which may be referred to as a show-detail page.

Where, for the method for acquiring the information introduction instruction, the specified page may provide a specified option that is used to obtain a historical activity record page. When a user selects the specified option, the terminal may obtain the information introduction instruction accordingly and display at least one installed application. Where, the user may trigger a selection operation for a certain application among the at least one application. If the user selects an application, the terminal may obtain and display the historical activity record page of the application and determine the historical activity record page as the target transaction page.

Figure 2D:
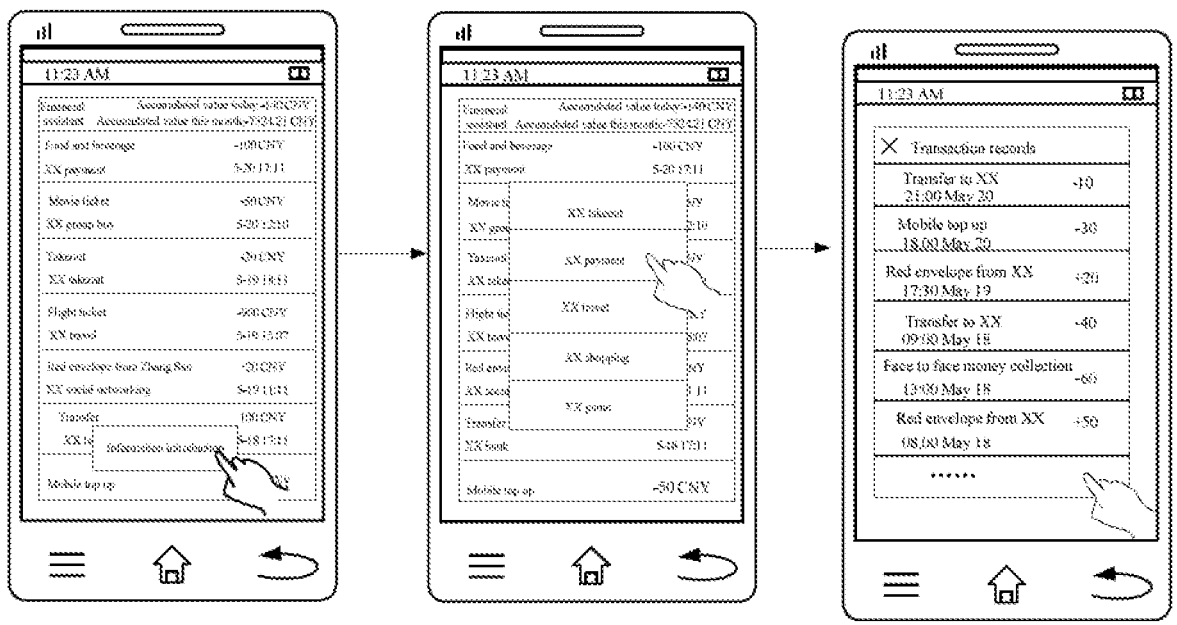
FIG. 2D is a schematic diagram of an operation for determining a historical transaction page shown in accordance with an example.

In a scenario of the example, referring to FIG. 2D, the specified option is an information introduction option. After a user clicks the information introduction option, the installed XX take-out application, XX payment application, XX travel application, XX shopping application, and XX game application may be displayed. After the user selects the XX payment application, it will switch to the historical activity record page of the XX payment application.

In step 202, the terminal acquires the DOM structure of the target transaction page.

In practice, any page can be represented by a DOM structure and the content in the page corresponds to the nodes in DOM structure. In other words, through visiting the nodes in the DOM structure, the content corresponding to the node may be acquired. Likewise, through acquiring the DOM structure of the target transaction page and visiting the node that saves the activity record information, the activity record information can be extracted.

Where, for the procedure of acquiring the DOM structure, the terminal can acquire the DOM structure during the procedure of displaying the User Interface (UI) of the target transaction page. Alternatively, the terminal can invoke the DOM interface provided by the target transaction page through Javascript, python, JavaScript Object Notation (JS) or other programming languages to acquire the DOM structure of the target transaction page Alternatively, the terminal may parse the target transaction page through a HyperText Markup Language (HTML) parser to obtain the DOM structure of the target transaction page. Where, the HTML parser may be any currently open source HTML parser In step 203, the terminal determines at least one text node that saves the text content in the DOM structure and traverses and reads the text content saved in the at least one text node to acquire the text content ready for processing.

The DOM structure fundamentally arranges all kinds of elements in the page in a tree structure, that is, the text content of the page may be saved in DOM structure and the text content is saved in at least one text node. Therefore, after the terminal acquires the DOM structure, it may traverse every text node in the DOM structure to extract the text content from the at least one text node successively such that at least one piece of activity record information may be extracted from the DOM structure.

For the procedure of traversing at least one text node, for any of the at least one text node, the terminal can acquire the node identifier of the text node in advance and then reads the text content saved in the text node based upon the acquired node identifier. Where, the node identifier is used to determine the corresponding text node in DOM structure. The node identifier may be the text node's identification (ID), name, tag name, class name, etc. Then, the content saved in each text node may be read successively through at least one acquired node identifier to obtain the text content ready for processing.

Where, regarding the procedure of reading the text content based upon the node identifier, the terminal can execute the read instruction corresponding to the node identifier through Javascript, python, json or other programming languages to read the text node so as to obtain the text content saved in the text node. For example, when the text node's ID is "text1", the terminal can execute document. getElementById (text1) to obtain the returned text content. For another example, when the text node's name is "money", the terminal can execute document. getElementByName (money) to obtain the returned text content.

In step 204, the terminal extracts the target content from the text content ready for processing based upon a preset text rule to obtain at least one piece of activity record information.

In step 203 above, the obtained text content ready for processing, may include some unrelated information in addition to the activity record information. In order to extract useful information from the text content ready for processing, the terminal may extract the target content from the text content ready for processing based upon the preset text rule, to filter and select the target content including the activity record information and filter out interference from the unrelated information.

In the first implementation, the terminal can pre-save at least one key content template. The preset text rule matches up with any of the at least one key content template. The terminal can traverse the text content ready for processing. When a character string matches up with any key content template, the character string may be extracted as a target content and the activity record information contained in the character string is obtained.

For example, when the key content template contains "pay  CNY", " CNY", or "withdraw  CNY" and the text content ready for processing contains "pay Zhang San 100 CNY through code scan with XX payment application", when the terminal traverses the text content ready for processing, it determines that the character string "pay 100 CNY" matches up with "pay  CNY", then it extracts this character string and takes "100 CNY" as the activity record information.

In the second implementation, the terminal can segment the text content ready for processing into a plurality of words and then implement a semantic analysis to the plurality of words. When the meaning of a word among the words is the activity record information, this word becomes the target content and the activity record information is obtained.

Where, the terminal may adopt a word segmentation method to segment the text content ready for processing into a plurality of words and then input the words into a classifier for semantic analysis. The classifier outputs the words whose meaning is the activity record information. Where, the classifier is generated through numerous word template trainings and is able to classify the words based upon the meaning.

For example, when the text content ready for processing is "pay Zhang San 100 CNY through code scan with XX payment application", the terminal may segment the text content ready for processing into "XX payment application", "Zhang San", "code scan", "pay 100 CNY" and input those words into the classifier. The classifier determines the meaning of "pay 100 CNY" as the activity record information and outputs "pay 100 CNY".

In the third implementation, considering that the format of the activity record information is usually the currency or numerical value format, the currency or numerical value format can be preset as the text rule. In other words, if the format of some content of the text content ready for processing is the currency or numerical value format, the content may be extracted as the target content.

It is necessary to explain that the above method takes extracting the target content from the text content ready for processing that contains unrelated information as an example. In another implementation, when one text node in the DOM structure is only used to save the activity record information but not to save unrelated information, the terminal may only read the text content saved in the text code and directly take the obtained text content as the activity record information and does not need to extract the target content from the text content.

In step 205, the terminal saves the at least one piece of activity record information to the transaction card.

In the example of the present disclosure, after obtaining the at least one piece of activity record information, the terminal saves the at least one piece of activity record information in the storage space corresponding to the transaction card. That is, the operating system saves the at least one piece of activity record information to the transaction card such that the activity record information may be displayed through the transaction card in the subsequent procedure. Where, the transaction card is displayed in the abovementioned specified interface in order to guarantee that the user may look up the activity record information quickly and easily.

It is necessary to explain that in order to avoid the exceptional situation of saving duplicated activity record information from happening, before the terminal saves the at least one piece of activity record information to the transaction card, it may determine whether each of the at least one piece of activity record information has been saved already. If a piece of activity record information has been saved, it will be filtered out and only the unsaved activity record information are to be saved in order to guarantee the accuracy of collecting the activity record information.

Where, the procedure of determining whether a piece of activity record information has been saved yet can be: to extract the transaction value and transaction time of the activity record information and look up the transaction value and transaction time of every activity record information among all the saved activity record information. If the transaction value and transaction time of the activity record information ready for saving matches up with the transaction value and transaction time of a saved piece of activity record information respectively, this piece of activity record information will be determined to have been saved. Additionally, considering that the activity record information may include a transaction object, the identifier of the transaction object may be extracted and the transaction value, transaction time and the identifier of the transaction object of each piece of all the saved activity record information may be looked up. If the transaction value, transaction time and the identifier of the transaction object of the activity record information ready for saving matches up with those of a saved piece of activity record information, this piece of activity record information will be determined to have been saved.

With the method provided in the example of the present disclosure, by obtaining the DOM structure of the target transaction page, the activity record information can be automatically extracted from the target transaction page with the DOM structure. Not only the user does not need to manually select every piece of activity record information but also the step is simplified, which may prevent any piece of activity record information from missing. The efficiency of obtaining the activity record information is raised. Extracting numerous amount of activity record information in a short period time can be accomplished, which has high operability and is more intellectualized.

Further, since the procedure of obtaining the activity record information from the application is performed in background, it will not affect the user using the application and avoid intervening the normal operation process of the user, which is more user-friendly.

Further, since the procedure of obtaining the activity record information is operated by the terminal, a user does not need to invest any learning costs, which is more practical.

Further, the method provided in the example of the present disclosure can be applied to extract the activity record information scattered in each application, which is versatile and convenient for the user to centrally manage and count all kinds of activity record information without manually looking up each application to acquire the activity record information, which raises user viscosity.

In summary, the method for acquiring the activity record information through the DOM structure is introduced above. Additionally, the examples of the present disclosure also support acquiring the activity record information through node injection. That is, In the second aspect, the examples of the present disclosure provide a method for acquiring activity record information through node injection.

Figure 3:
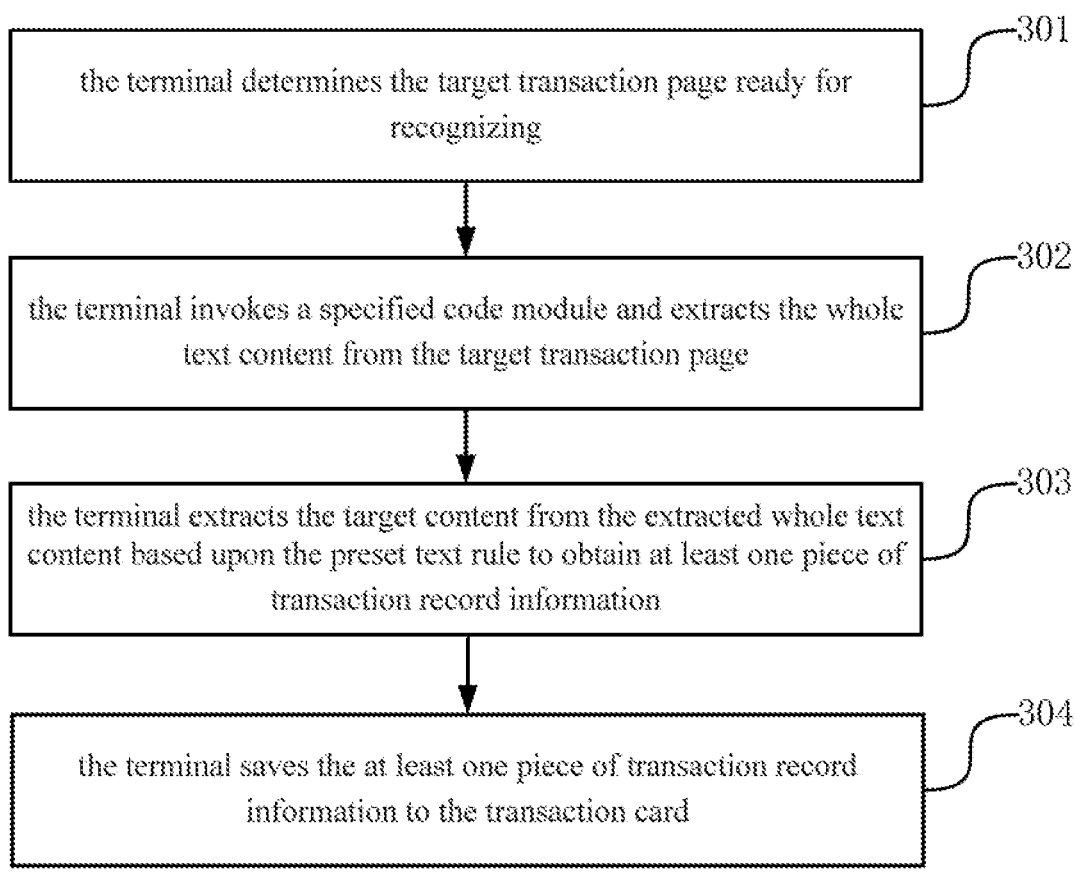
FIG. 3 is a flow chart of a method for acquiring activity record information shown in accordance with an example.

Referring to FIG. 3, it shows a flow chart of a method for obtaining activity record information through node injection, including the following steps:

In step 301, the terminal determines the target transaction page ready for recognizing.

This step is similar to step 201, which is not repeated here.

In step 302, the terminal invokes a specified code module and extract the whole text content from the target transaction page.

In some examples, the abovementioned specified code module is injected by the operating system during the procedure of uploading the target transaction page.

In the example of the present disclosure, the terminal may pre-save the specified code module that is used to extract the whole text content from the target transaction page. In terms of the code format, the specified code module may include formats like javascript, vbscript, and python. In terms of the input parameters and output parameters, the input parameter of the specified code module is the identifier of the text content and the output parameter is the text content corresponding to the identifier. The specified code module can be set in the terminal by developers or downloaded by the terminal from a server.

When the target transaction page is uploaded or being uploaded, the terminal will read the specified code module from the location where the specified code module is saved and inject the specified code module into the target transaction page. For example, the terminal adds the specified code module into the HTML document of the target transaction page and operate the HTML document such that the specified code module may be invoked to extract the whole text content from the target transaction page.

Where, in the procedure of injecting the specified code module into the target transaction page, the terminal can invoke a code injection function and embed the specified code module in the code injection function to inject the specified code module into the target transaction page by running the code injection function.

In the example of the present disclosure, the terminal may predetermine the identifier of the text content and takes the identifier as the input parameter of the specified code module. After the specified code module is invoked, it will traverse the whole content in the target transaction page based upon the determined identifier of the text content to extract and return the text content.

Where, the identifier of the text content may be the name and type of the text content, etc. For example, if the identifier of the text content is "text1", the terminal can execute getElementById (text1) to obtain the text content corresponding to text1.

In step 303, the terminal extracts the target content from the extracted whole text content based upon the preset text rule to obtain at least one piece of activity record information.

This step is similar to step 204, which is not repeated here.

In step 304, the terminal saves the at least one piece of activity record information to the transaction card.

This step is similar to step 205, which is not repeated here.

With the method provided in the example of the present disclosure, by invoking the specified code module injected in the target transaction page, the activity record information can be automatically extracted from the target transaction page with the injected specified code module. Not only the user does not need to manually select every piece of activity record information for extraction but also the step is simplified, which may prevent any piece of activity record information from missing. The efficiency of obtaining the activity record information is raised. Extracting numerous amount of activity record information in a short period time can be accomplished, which has high operability and is more intellectualized.

Further, since the procedure of obtaining the activity record information from the application is performed in background, it will not affect user using the application and avoid intervening the normal operation process of the user, which is more user-friendly.

Further, since the procedure of obtaining the activity record information is operated by the operating system, the user does not need to invest any learning costs, which is more practical.

Further, the method provided in the example of the present disclosure can be applied to extract the activity record information scattered in each application, which is versatile and convenient for the user to centrally manage and count all kinds of activity record information without manually looking up each application to obtain the activity record information, which raises user viscosity.

In summary, the method for acquiring the activity record information through node injection is introduced above. Additionally, the examples of the present disclosure also support a method for acquiring the activity record information through Optical Character Recognition (OCR). That is, In the third aspect, the examples of the present disclosure provide a method for acquiring activity record information through OCR.

Figure 4A:
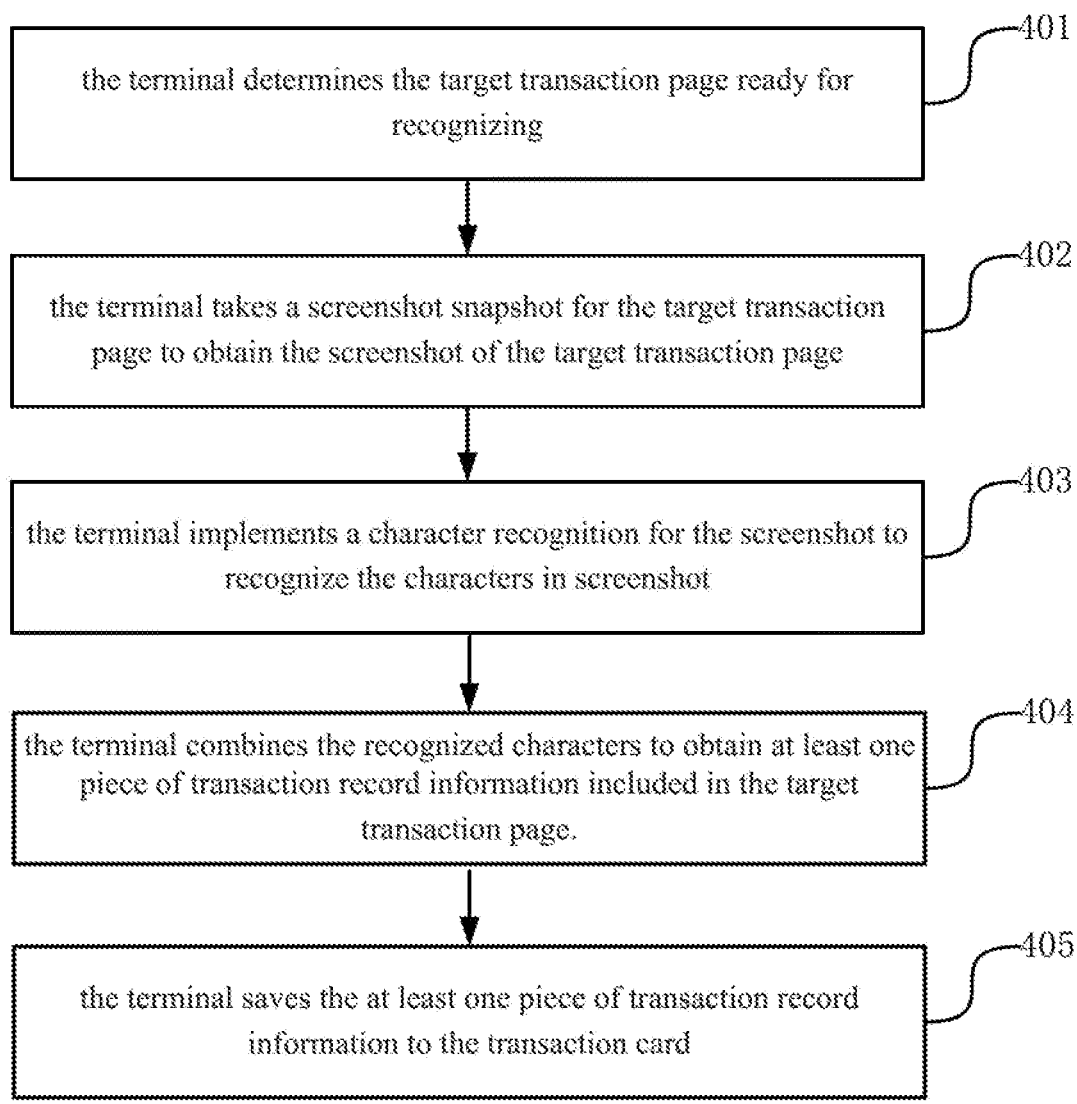
FIG. 4A is a flow chart of a method for acquiring activity record information shown in accordance with an example.

Referring to FIG. 4A, it shows a flow chart of a method for acquiring activity record information, including following steps:

In step 401, the terminal determines the target transaction page ready for recognizing.

This step is similar to abovementioned step 201. The difference is, in the situation that target activity record page is a historical activity record page, after the historical activity record page is displayed, the user can trigger a screenshot operation for the historical activity record page. After the terminal detects the screenshot operation, it takes the screenshot portion of the page as the target transaction page to guarantee that the target transaction page contains the activity record information that the user wants to extract and excludes the information that the user does not want to extract which satisfies the user's self-definition request and guarantees that the obtained activity record information fits the user's wish. Where, the screenshot operation may be to trigger a drag operation to the vertexes of the page. Certainly, the user can also take the whole historical transaction page as the target transaction page through a long screenshot operation.

The detailed procedure of taking a screenshot for the historical transaction page may include following steps 4011-4013.

In step 4011, an introduction instruction is obtained.

For the detailed method of obtaining the introduction instruction, the terminal may display the specified option in the historical activity record page. When a user triggers the confirmation operation for the specified option, the terminal obtains the introduction instruction, which instructs to introduce the historical activity record pages. For example, referring to FIG. 4B, the specified option is an introduction option. After user clicks the introduction option, the terminal acquires the introduction starting instruction.

In step 4012, the beginning and ending positions for the page screenshot is determined on the historical activity record page as a response to the introduction instruction.

For the historical activity record page, the beginning and ending positions may be positions that have been displayed in the screen, or positions that are displayed after a slide operation is detected. Regarding the procedure of determining the beginning and ending positions, the following methods could be included.

In the first implementation, the terminal may take the top of the historical activity record page as the beginning position and display the historical activity record page by automatically scrolling from top to bottom. When a user triggers an operation to end the scrolling, the terminal takes the bottom of the currently displayed historical activity record page as the ending position.

In the second implementation, the terminal may display a scroll bar on the historical activity record page. When a user triggers a scroll-up operation for the scroll bar, the terminal will scroll up and display the historical activity record page. When the user triggers a scroll-down operation for the scroll bar, the terminal will scroll down and display the historical activity record page. The terminal may take the position where the historical activity record page is scrolled up to the top as the beginning position and take the position where the historical activity record page is scrolled down to the bottom as the ending position.

In the third implementation, the terminal may obtain an area dragged out by a user from the historical transaction page and take this area as the page screenshot area. Where, the user may click a position in the historical transaction page to drag out an area and drop it at another position. The terminal can determine the area formed by the click position and the drop position and determine the beginning and ending positions of the area.

Certainly, the terminal can also take the topmost part of the historical transaction page as the beginning position and the bottommost part of the historical transaction page as the ending position. That is, it takes the whole historical transaction page as the target transaction page ready for screenshot.

It is necessary to explain that for any method for obtaining the beginning and ending positions, after the terminal obtains the beginning and ending positions, it may display a preview page formed by the beginning and ending positions. A user may trigger an editing operation on the preview page to adjust the beginning and ending positions. The terminal will take the adjusted beginning position as the final beginning position and the adjusted ending position as the final ending position.

For example, the terminal may display two arrows at the beginning and ending positions respectively. A user may click the arrow at the beginning position, drag it down, and drop it at a certain position. Then, the terminal will take the drop position as the final beginning position.

In step 4013, the terminal takes the partial page between the beginning position and ending position as the target transaction page.

In step 402, the terminal takes a screenshot for the target transaction page to obtain the screenshot of the target transaction page.

After determining the target transaction page, the terminal may automatically take a screenshot for the target transaction page. Where, for a target transaction page that is longer than a screen, the screenshot operation for the target transaction page can be called a long screenshot.

In step 403, the terminal implements a character recognition for the screenshot to recognize the characters in screenshot.

Step 403 may include the following steps 4031-4033 in detail.

In step 4031, the terminal cuts out at least one character zone from the screenshot.

After obtaining the screenshot, the terminal could first preprocess the screenshot to reduce useless information from the screenshot. The preprocessing procedure may include binarization, noise reduction, etc. Binarization is the process of converting a color screenshot to a black and white screenshot. Noise reduction is the process of removing noise and stain from the screenshot with noise reduction algorithms.

After obtaining the preprocessed screenshot, the terminal can search the connected zones in the screenshot, take every found connected zone as a character zone, and cut it out. Alternatively, the terminal can determine the size of each character zone and segment the screenshot based upon the size to obtain at least one character zone. Certainly, other methods can be adopted to segment the screenshot, which is not limited by the example of the present disclosure.

In step 4032, for each of the at least one character zone, the terminal extracts the feature information from the character zone.

For each character zone, the terminal could adopt a feature extraction algorithm to extract the feature information from the character zone. The zone information could be stroke feature, outline feature, structure feature, etc.

In step 4033, based upon the feature information, the terminal search a character in the prebuilt character library and take the character that matches up with the feature information in the character library as the recognized character in the character zone.

The terminal may prebuild a character library and save the feature information of all the characters in the character library. When the operating system obtains the feature information of a character zone, it may traverse every character in the character library and calculate the similarity degree between the feature information of the character zone and the feature information of the traversed character. If the similarity degree is greater than the threshold, the terminal determines that the traversed character to be the character that matches up with the character zone, that is, the operating system takes this character as the recognized character in the character zone.

In step 404, the terminal combines the recognized characters to obtain at least one piece of activity record information included in the target transaction page.

After at least one character corresponding to at least one character zone is recognized, the terminal permute the at least one character in the order of the at least one character zone and combine at least one character after permutation to obtain the text content ready for processing. Then a method that is similar to step 204 is adopted to extract the target content from the text content ready for processing to obtain at least one piece of activity record information.

In summary, the terminal completes the character recognition for the target transaction page to obtain the at least one piece of activity record information included in the target transaction page. Where, the method for recognizing characters in the screenshot of the target transaction page is called an OCR method.

In step 405, the terminal saves the at least one piece of activity record information to the transaction card.

This step is similar to step 205, which is not repeated here.

With the method provided by the examples of the present disclosure, the activity record information is automatically extracted from the target transaction page with character recognition through recognizing the characters in the target transaction page. Not only the user does not need to manually select every piece of activity record information for extraction but also the step is simplified, which may prevent any activity record information from missing. The efficiency of obtaining the activity record information is raised. Extracting numerous amount of activity record information in a short period time can be accomplished, which has high operability and is more intellectualized.

Further, since the procedure of acquiring the activity record information from application is performed in background, it will not affect a user using the application and avoid intervening the normal operation process of the user, which is more user-friendly.

Further, since the procedure of acquiring the activity record information is operated by the terminal, the user does not need to invest any learning costs, which is more practical.

Further, the method provided in the example of the present disclosure can be applied to extract the activity record information scattered in each application, which is versatile and convenient for the user to centrally manage and count all kinds of activity record information without manually looking up each application to obtain the activity record information, which raises user viscosity.

It is necessary to supplement that in addition to the above three methods for acquiring the activity record information, the terminal may also adopt a short message, an interface, a render layer drawing, or other methods to acquire the activity record information.

For the method for acquiring the activity record information through a short message, considering that after a user triggers a transaction operation, servers that are associated with banks, financial applications or other application involving online payment will send a notification short message where the activity record information is included to the terminal. In this situation, the terminal may pre-save the key character string of the notification short message, which may reflect the feature of the notification short message for the transaction operation. When the terminal has received the short message, it determines whether the short message matches up with the key character string. When the short message matches up with the key character string, the short message is determined to be the notification short message and the activity record information may be extracted from the short message.

For example, the key character string of the notification short message may be "bank card with ending numbers**", "income  CNY", "current savings account balance is  CNY", etc. If the terminal receives a short message "the bank card with ending numbers XXXX had 5.2 CNY income through an ATM machine on May 20, 2017", since this short message contains two key character strings, i.e., "bank card with ending numbers " and "income  CNY", the short message is determined to be the notification short message. Meanwhile "May 20, 2017" and "5.2 CNY" are extracted to be as the activity record information.

For the method for acquiring the activity record information through an interface, the terminal provides a specified system interface. The specified system interface is open to every application in the terminal and is an open interface for each application to report transaction that happens in each application itself to the terminal. Then, when a transaction happens in an application, the application actively send a broadcast message to the terminal through the specified system interface. After the terminal receives the broadcast message from the application, the activity record information can be extracted from the broadcast message.

Where, for an application, when the terminal completes a transaction through the application, the application responds to the transaction and generates a broadcast message corresponding to the transaction based upon a predetermined interface specification. The broadcast message carries the activity record information. After the terminal receives the broadcast message, it analyzes the broadcast message to obtain the activity record information.

For the method for acquiring the activity record information through a render layer drawing, the terminal may adopt the above step 201 to determine the target transaction page ready for recognizing. During the procedure of rendering the target activity record page, the text content ready for rendering or the rendered text content is taken as the text content ready for processing and the above step 204 is adopted to the obtain the activity record information from the text content ready for processing.

In summary, six methods for acquiring the activity record information through DOM structure, node injection, OCR recognition, short message, interface, and render layer drawing have been described above respectively. Based up the six methods for acquiring the activity record information, the examples of the present disclosure further provide a method for displaying activity record information. By adopting this display method, the terminal can aggregate activity record information from each financial application and centrally display it on the specified interface. This method is detailed in the fourth aspect below.

In the fourth aspect, the example of the present disclosure provides a method for displaying activity record information.

Referring to FIG. 5A, it shows a flow chart of a method for displaying activity record information. The method is performed by a terminal. The method includes the following steps:

In step 501, the terminal extracts and integrates the activity record information from at least one installed application to obtain the specified activity record information.

The terminal can save the activity record information of an application with the methods described in the above examples and can determine the specified activity record information from at least one piece of saved activity record information. Where, the specified activity record information is displayed in a specified interface. The specified activity record information not only may be the activity record information of a latest happened transaction but also may be obtained by statistics for at least one piece of activity record information during a recent period of time.

In the first implementation, the terminal may take a piece of activity record information that records a latest happened transaction as the specified activity record information. The activity record information at least includes the transaction value, transaction time, and transaction name. For this method, the terminal may sort at least one piece of saved activity record information in the transaction time order from the latest to the earliest and take the first activity record information as the specified activity record information.

In the second implementation, the terminal may determine at least one piece of activity record information that recording a transaction within the specified period of time and acquire the transaction value for each of the at least one piece of activity record information. It may calculate a summation of the at least one transaction value as the specified activity record information.

The ending point of the specified period of time is the current moment and the beginning point is determined based on the current moment and the statistic period. The statistic period could be one day, one month, or determined by the operation set up by a user. For example, when the current moment is 20:00 May 20th and the statistic period is one day, the specified period of time is from 00:00 to 20:00 May 20th. When the statistic period is one month, the specified period of time is from 00:00 May 1st to 20:00 May 20th.

In a determined specified period of time, for each at least one piece of saved activity record information, the terminal may extract the transaction time from the activity record information and determine whether the transaction time is within the specified period of time. If the transaction time is within the specified period of time, the transaction value included in the activity record information may be acquired.

After acquiring the transaction value of at least one piece of activity record information that records a transaction within the specified period of time, the terminal calculates the at least one transaction value to obtain an accumulated transaction value and obtain the specified activity record information including the specified period of time and the accumulated transaction value.

After obtaining the specified activity record information, the terminal stores the specified activity record information in order to acquire and display the specified activity record information that has been stored.

In step 502, after switching to the specified interface, the terminal displays the specified activity record information in the specified interface.

When the terminal obtains an interface switching instruction, it switches to the specified interface as a response to the interface switching instruction. Where, the interface switching instruction may be triggered by a detected slide operation. For example, when the operation of slide left cross the main screen is detected, the instruction to switch to the hiboard interface is obtained to switch to the hiboard.

Figure 5B:
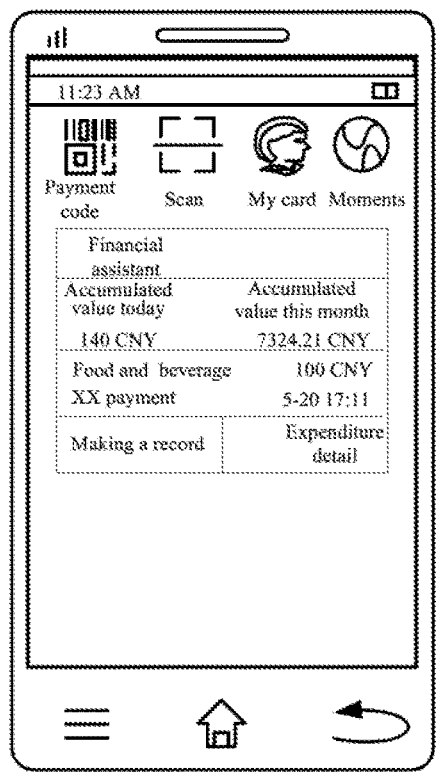
FIG. 5B is a schematic diagram of a transaction card shown in accordance with an example.

In order to display the specified activity record information beautifully and clearly, the terminal displays the transaction card in the specified interface. The specified activity record information is displayed on the transaction card (as shown in FIG. 5B) in items of information.

For the display format of the specified activity record information in the items of information, the terminal may preset display formats for all kinds of content for the specified activity record information. The display formats may be Cascading Style Sheets (CSS). Where, all kinds of content may include transaction value, transaction time, transaction name, etc. Display format includes font, size, position, distance, icon, etc. Then, the terminal can display all kinds of content in the specified activity record information in the determined display format.

In some examples, in addition to the function of displaying the specified activity record information, the transaction card further provides at least one of the functions of adding new activity record information and showing detail activity record information.

Regarding the function of adding new activity record information, the terminal can acquire an instruction addition information that instructs to add activity record information and display an input interface as a response to the information addition instruction. Afterwards, the terminal acquires the input information from the input interface generates newly added activity record information based upon the input information and displays newly added activity record information in the specified interface.

Figure 5C:
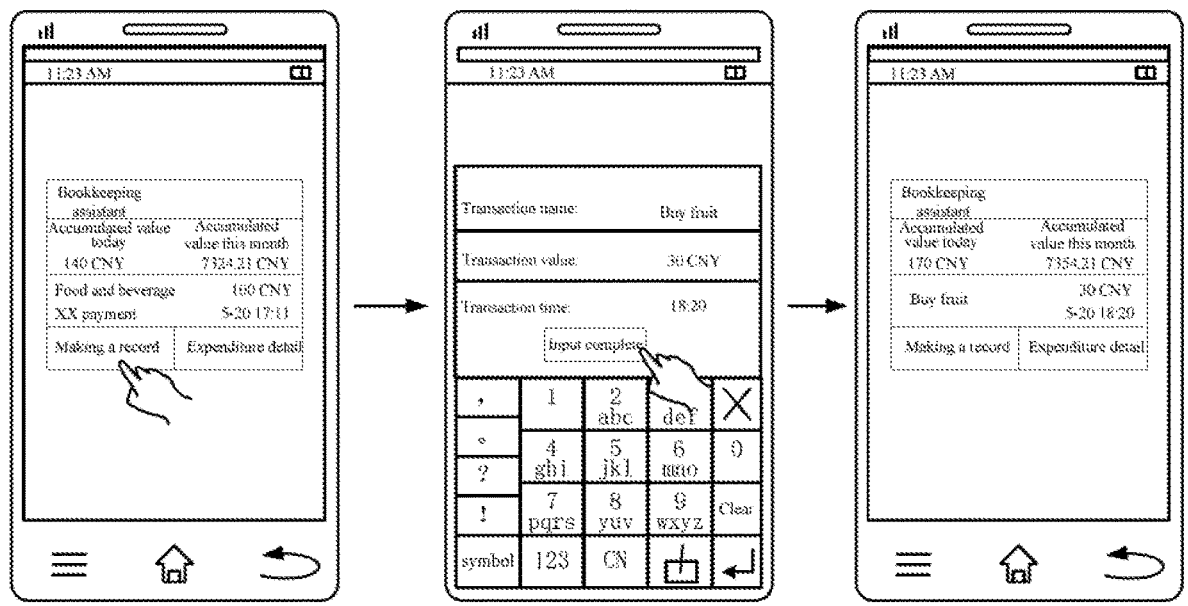
FIG. 5C is a schematic diagram of acquiring an information addition instruction shown in accordance with an example.

The instruction addition information may be triggered by a confirmation operation on the transaction card in the specified interface. In a scenario of the example, referring to FIG. 5C, when the terminal detects a confirmation operation triggered by user to the "making a record" option on the transaction card, it acquires an information addition instruction, displays an input interface, and obtains "buy fruit", "30 CNY" and "18:20" in the input interface. Combining the input information, the terminal generates the newly added activity record information and displays it in the specified interface.

Additionally, after the new activity record information is added, the terminal may extract the transaction value from the newly added activity record information, add the transaction value to the summation of the determined accumulated transaction value, to update the accumulated transaction value.

Regarding the function of showing the detail activity record information, the terminal may acquire a show-detail instruction, and display the plurality of activity record information in items of information in the transaction time order from the latest to the earliest as a response to the show-detail instruction. The show-detail instruction may be triggered by a confirmation operation on the transaction card in the specified interface.

Figure 5D:
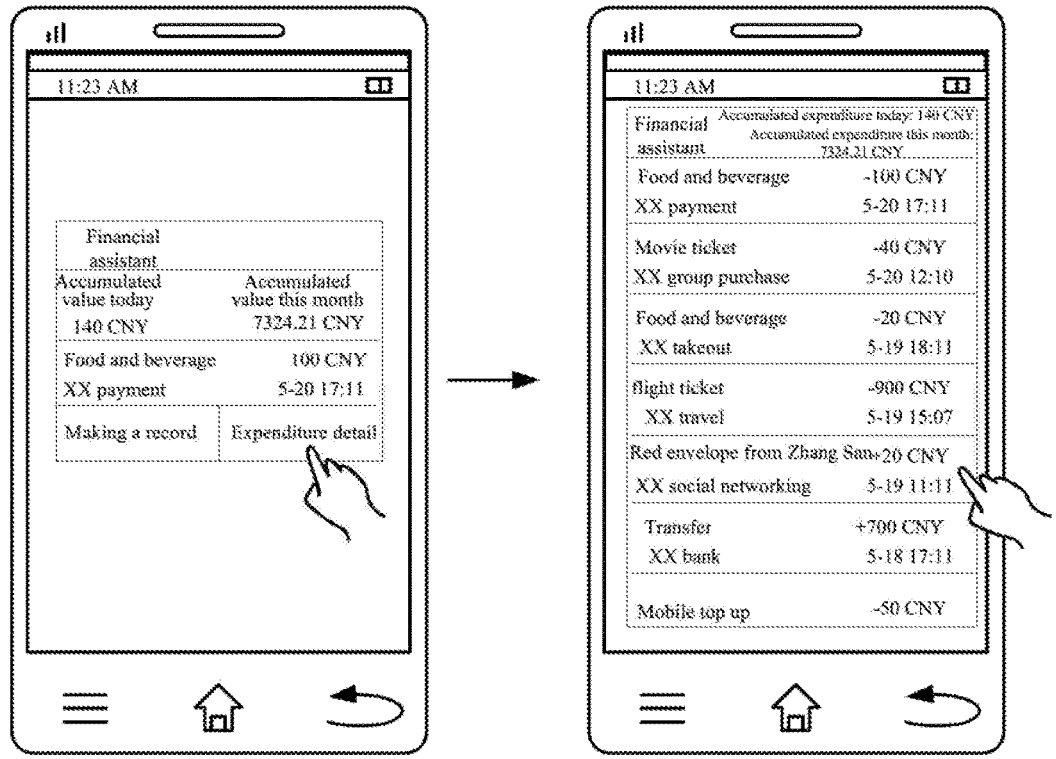
FIG. 5D is a schematic diagram of acquiring a show-detail instruction shown in accordance with an example.

In a scenario of the example, referring to FIG. 5D, when the terminal detects the confirmation operation triggered by user for the expenditure detail option on the transaction card, it confirms to obtain the show-detail instruction, switches to the home page of the financial assistant application, and displays the plurality of activity record information on the page.

Considering user's reading habit of usually checking the latest activity record information first and then checking historical activity record information, the terminal may sort the plurality of activity record information in the transaction time order from the latest to the earliest and display the plurality of activity record information that has been sorted on the page. Alternatively, among the plurality of activity record information, the activity record information that records the latest happened transaction is displayed at the top of the page and the activity record information that records the earliest happened transaction is displayed at the bottom of the page.

Additionally, when the terminal detects a slide operation, it may display other activity record information other than the plurality of activity record information in a scrolling manner in the transaction time order from the latest to the earliest for the convenience of user to obtain more activity record information.

The first point that needs to be explained is that the above examples only take displaying a plurality of activity record information in the transaction time order from the latest to the earliest as an example. In practice, the terminal may also display a plurality of activity record information in other orders, for example, in the transaction value order from the biggest to the smallest.

The second point that needs to be explained is that for the plurality of activity record information, the terminal may display the activity record information filtered and selected from the plurality of activity record information according to a filtering instruction. The filtering instruction may be to filter and select activity record information of the specified application, the activity record information between the user and the specified object, the activity record information corresponding to the specified transaction name, and activity record information within a specified period of time such that users may look up the activity record information they want based on their needs.

For example, when the filtering instruction is to filter and select the activity record information of the XX take-out application, the terminal may traverse the provider for each piece of the plurality of activity record information to filter and select the activity record information provided by the XX take-out application from the plurality of activity record information. For another example, when the filtering instruction is to filter and select the activity record information between the user and "Zhang San", the terminal may traverse the transaction object for each piece of the plurality of activity record information to filter and select the activity record information with transaction object being "Zhang San" from the plurality of activity record information. For still another example, when the filtering instruction is to filter and select the activity record information in October 2016, the terminal may traverse the transaction time of each piece of the plurality of activity record information to filter and select the activity record information in October 2016.

The third point that needs to be explained is that the terminal may also delete, modify, or implement other operations to each piece of the plurality of activity record information.

For the procedure of deleting activity record information, for any of the plurality of activity record information, the terminal acquires the information deletion instruction that instructs to delete the activity record information and delete the activity record information as a response to the information deletion instruction. Alternatively, after the activity record information is deleted, the terminal may refresh the current page automatically to display the details of the activity record information again after the deletion operation is performed.

Regarding the procedure of acquiring the information deletion instruction, for each piece of activity record information, a deletion option may be displayed in the item of information where the activity record information is located or be displayed after a selection operation triggered for the item of information is detected. After a confirmation operation for the deletion option is detected, the terminal obtains the information deletion instruction and deletes the activity record information. Additionally, after the terminal obtains the information deletion instruction, it may display a prompt message to prompt the user whether to delete the activity record information. After a confirmation operation for the prompt message is detected, then the activity record information may be deleted.

Additionally, before the activity record information is deleted, the terminal may extract the transaction value from the activity record information and update the specified activity record information based upon the transaction value. If the transaction value is an expenditure transaction value, the transaction value is added to the transaction value of the specified activity record information. If the transaction value is an income transaction value, the transaction value is subtracted from the transaction value of the specified activity record information.

Figure 5E:
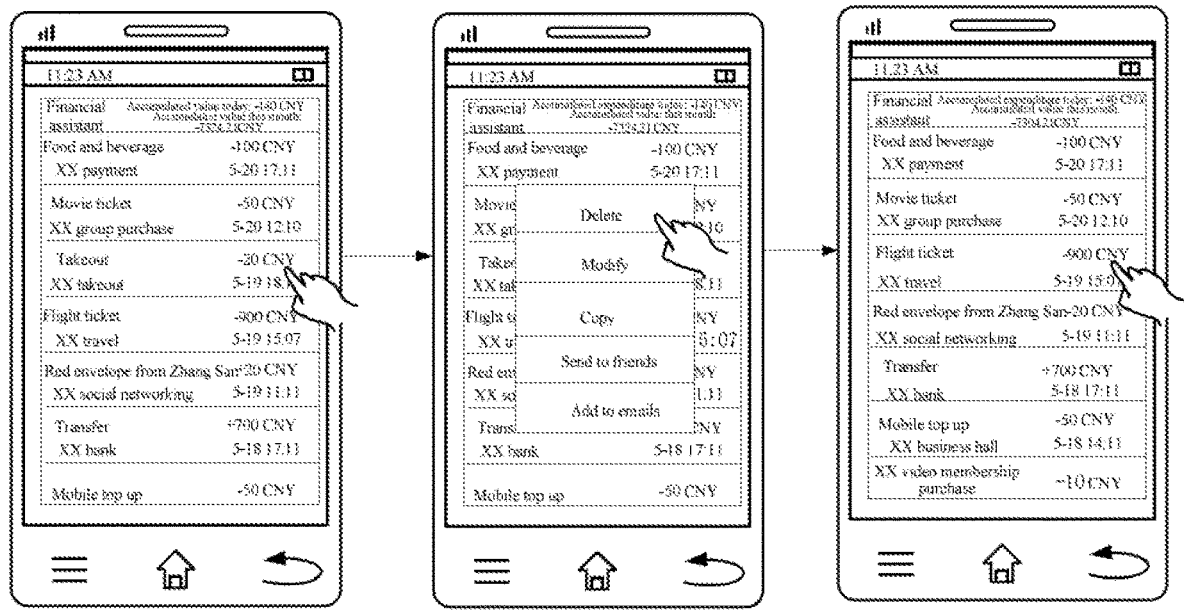
FIG. 5E is a schematic diagram of deleting activity record information shown in accordance with an example.

For example, referring to FIG. 5E, when the selection operation triggered for the item of information where the activity record information corresponding to "takeout" application is located is detected, the terminal may display a deletion option. When the terminal detects the confirmation operation for the deletion option, it deletes this activity record information. Additionally, since the transaction value for the activity record information is 20 CNY, the operating system may update the accumulated expenditure 7324.24 CNY this month to 7304.21 CNY.

For the procedure of modifying activity record information, for each piece of activity record information, the terminal acquires an information modification instruction, displays the activity record information in a modifiable way as a response to the information modification instruction, acquires the modification information of the activity record information and updates the activity record information in accordance with the modification information.

Regarding the procedure of acquiring the information modification instruction that may be triggered by a confirmation operation on the item of information where the activity record information is located, for each piece of activity record information, a modification option may be displayed in the item of information where the activity record information is located or displayed after a selection operation triggered for the item of information is detected. After the confirmation operation for the modification option is detected, the terminal acquires the information modification instruction.

Regarding the procedure of displaying the information modification ready for modifying, the terminal may display the transaction value, transaction time, transaction name, or other contents in the activity record information in a modifiable way. For example, displaying transaction value in a modifiable way may refer to displaying a flickering cursor at the end of the transaction value and a virtual keyboard on the page. When a keystroke click operation on the virtual keyboard is detected, the information corresponding to virtual the keystroke is taken as the modification information and the original transaction value is replaced with the modification information. Certainly, the terminal may display a prompt message after obtaining the modification information to prompt the user whether to update the activity record information. After the confirmation operation for the prompt message is detected, then the activity record information is updated. Additionally, after updating the activity record information, the terminal may save the updated activity record information. When the activity record information is display next time, the updated activity record information may be acquired and presented to the user directly.

Additionally, when activity record information is updated, the terminal may update the transaction value of the specified activity record information based upon the updated transaction value. For example, it may calculate the transaction value difference between the transaction values before update and after update and add the difference to the transaction value of the specified activity record information.

Figure 5F:
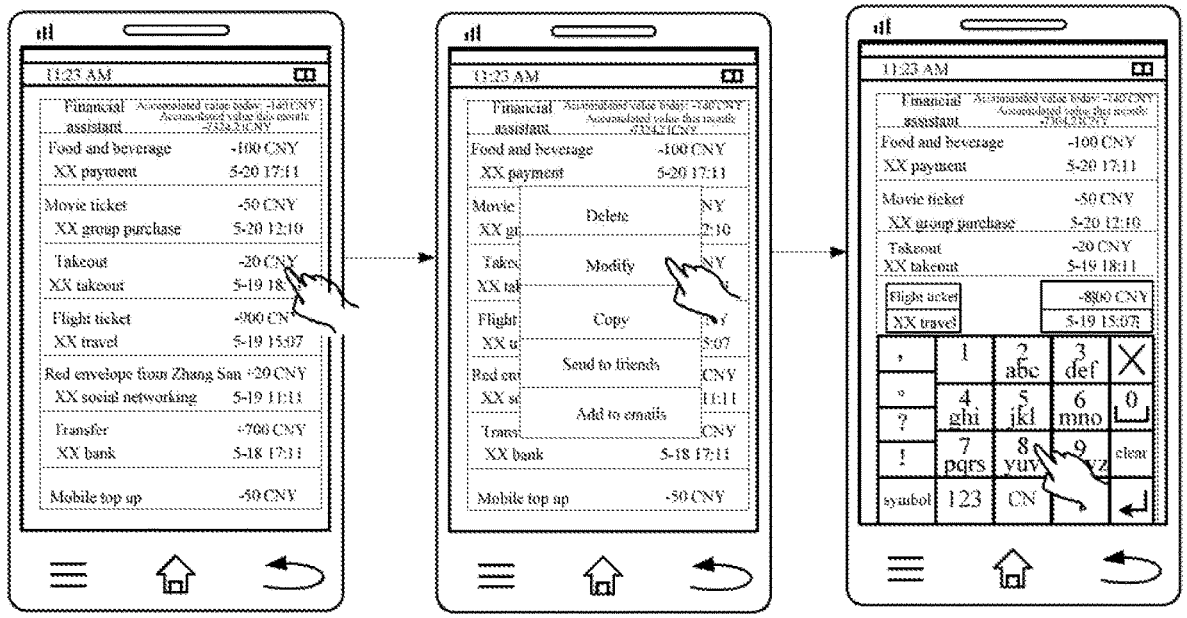
FIG. 5F is a schematic diagram of modifying activity record information shown in accordance with an example.

For example, referring to FIG. 5F, when the terminal detects the selection operation triggered for the item of information where the activity record information corresponding to "flight ticket" is located, it may display the modification option. When the confirmation operation for the modification option is detected, the operating system may display the activity record information in a modifiable way. Additionally, since the transaction value in the modified activity record information changes from 900 CNY to 800 CNY, the terminal may update the accumulated expenditure for this month from 7324.24 CNY to 7224.21 CNY.

Certainly, the above only takes deletion and modification operation of the activity record information as an example. In practice, the financial assistant may also have the function of duplicating activity record information and sending activity record information to a contact person. For example, after the selection operation for the activity record information done by a user is detected, the social networking application interface can be invoked and the activity record information can be sent to the user's contact person through the social networking application.

The fourth point that needs to be explained is that for the specified activity record information that records the latest happened transaction, a user can directly delete or modify the specified activity record on the transaction card without having to switch to the main interface of the financial assistant application.

Figure 5G:
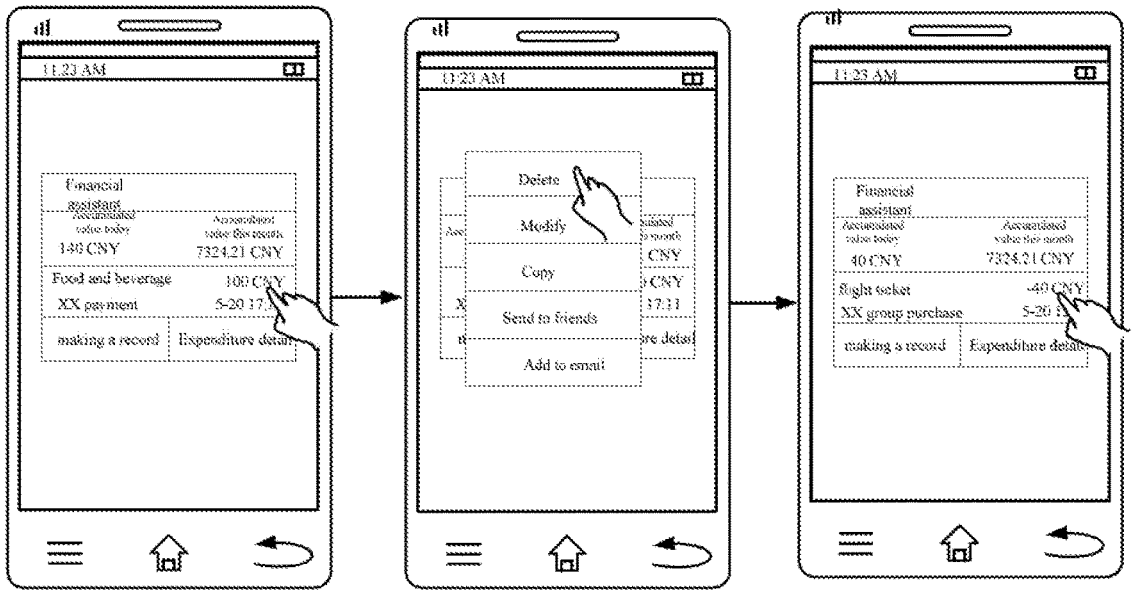
FIG. 5G is a schematic diagram of deleting specified activity record information shown in accordance with an example.

For example, referring to FIG. 5G, the terminal can obtain the information deletion instruction for the specified activity record information from the transaction card and delete the specified activity record information. Additionally, after deleting the specified activity record information, the terminal can re-obtain the activity record information that record the latest happened transaction among the plurality of activity record information in order to switch to the specified activity record information. Where, the information deletion instruction may be triggered by a confirmation operation on the deletion option on the transaction card.

Figure 5H:
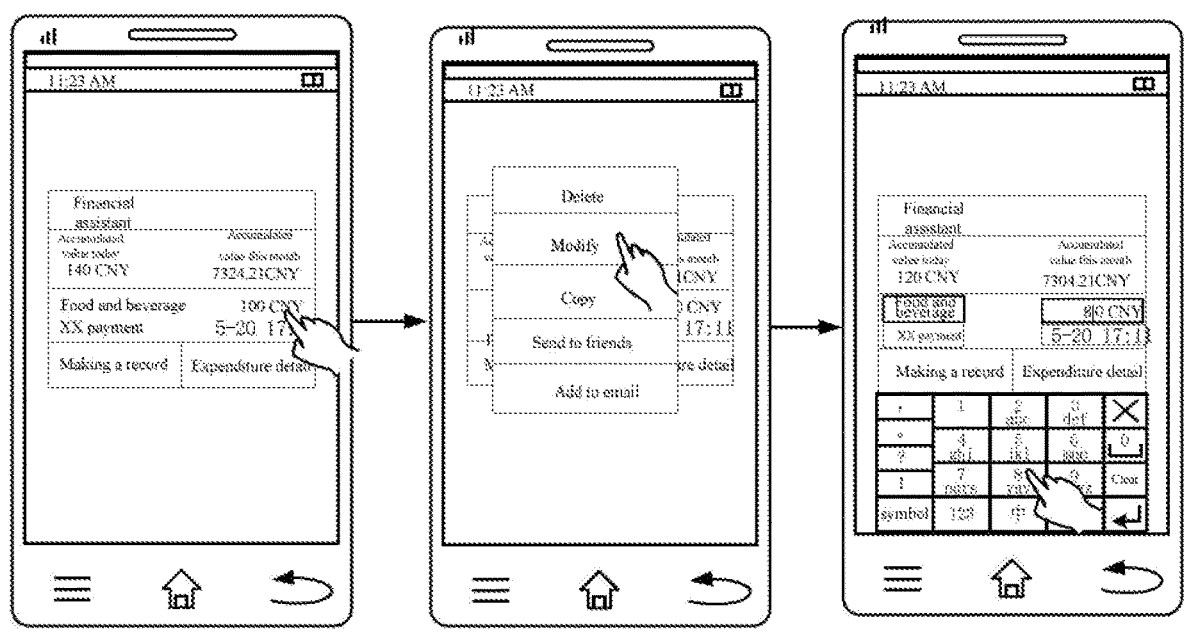
FIG. 5H is a schematic diagram of modifying specified activity record information shown in accordance with an example.

For another example, referring to FIG. 5H, the terminal can obtain the information modification instruction for the specified activity record information from the transaction card, display the specified activity record information in a modifiable way, obtain the modification information of the specified activity record information, and update the specified activity record information based upon the modification information. Where, the information modification instruction may be triggered by a confirmation operation on the modification option on the transaction card.

With the method in the examples of the present disclosure, after the specified activity record information in an activity category is acquired from extracting and integrating the activity record information of all applications that are in the activity category and are installed in the terminal, the specified activity record information may be displayed in the specified interface. Since the specified activity record information may come from all applications in the activity category in the terminal, the activity record information scattered in each application can be displayed through the specified interface. The user does not have to look up the activity record information in each application respectively, which may prevent any activity record information missing. It is convenient to arrange and aggregate all kinds of activity record information of various applications, which provides a more user-friendly interface for the user.

Furthermore, the user just needs to trigger the instruction of switching to the switching interface to look up the activity record information displayed in the specified interface without having to go through the multiple steps like click application icon, click the virtual key to enter personal page, execute operation of bringing up transaction statement on the personal page, which simplifies the steps and is quicker.

Furthermore, the user can delete or modify the latest happened activity record information directly on the transaction card, which makes the operation simpler and quicker. Additionally, new activity record information can be added and historical activity record information can be deleted or modified, which extends the management method for activity record information.

Figure 6:
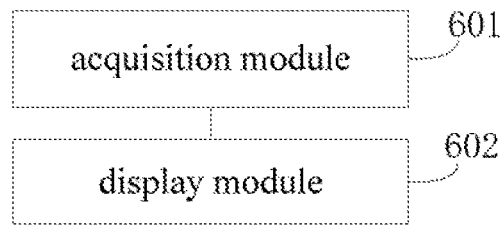
FIG. 6 is a block diagram of a device for displaying activity record information shown in accordance with an example.

FIG. 6 shows a block diagram of a device for displaying activity record information in accordance with an example. Referring to FIG. 6, this device includes an acquisition module 601 and a display module 602.

The acquisition module 601 is configured to acquire the specified activity record information after switching to the specified interface;

The display module 602 is configured to display the specified activity record information in the specified interface.

With the device provided in the examples of the present disclosure, after the specified activity record information is obtained from extracting and integrating the activity record information of at least one application installed in the terminal, the specified activity record information may be displayed in a specified interface, such that the activity record information scattered in each application may be centrally displayed. The user does not have to look up the activity record information in each application respectively, which may prevent any activity record information missing. It is convenient to arrange and aggregate all kinds of activity record information of various applications.

In some implementations, the specified activity record information at least includes a transaction value, a transaction time, and a transaction name. The specified activity record information records the latest happened transaction.

In some implementations, the device also includes:

a determination module configured to determine at least one piece of activity record information, wherein each of the at least one piece of activity record information records a transaction happening within the specified period of time;

the acquisition module 601 is further configured to acquire the transaction value of each of the least one piece of the activity record information;

a calculation module configured to calculate a summation of at least one obtained transaction value as the specified activity record information.

In some implementations, the display module 602 is configured to display a transaction card in the specified interface. The specified activity record information is displayed on the transaction card in the item of information.

In some implementations, the acquisition module 601 is further configured to acquire a show-detail instruction. The show-detail instruction instructs to display the detail of the activity record information.

The display module 602 is further configured to display the plurality of activity record information in items of information in the transaction time order from the latest to the earliest as a response to the show-detail instruction.

In some implementations, the display module 602 is further configured to display the other activity record information other than the plurality of activity record information in a scrolling manner in the transaction time order from the latest to the earliest after a slide operation is detected.

In some implementations, the acquisition module 601 is further configured to acquire an information deletion instruction that instructs to delete any piece of the plurality of activity record information. The device further includes:

a deletion module configured to delete the activity record information as a response to the information deletion instruction.

In some implementations, the acquisition module 601 is further configured to acquire an information modification instruction that instructs to modify any piece of the plurality of activity record information, to acquire an information modification instruction from the item of information where the activity record information is located;

the display module 602 is further configured to display the activity record information in a modifiable way according to the information modification instruction.

The device further includes an update module configured to acquire the modification information of the activity record information and update the activity record information according to the modification information.

In some implementations, the acquisition module 601 is further configured to acquire an information addition instruction from the transaction card in the specified interface;

the display module 602 is further configured to display an input interface as a response to the information addition instruction;

the acquisition module 601 is further configured to acquire input information from the input interface;

The device further includes a generation module configured to generate newly added activity record information based upon the input information.

The display module 602 is further configured to display the newly added activity record information in the specified interface.

Regarding device of the above embodiment, the specific method of operation performed by each module has been described in detail in the embodiment of the method, and the description thereof may not be described in detail herein.

It should be noted that the device for displaying activity record information provided by the above example is exemplified only by the above division of each of the functional modules when the device displays the activity record information. In practice, the above-described functions may be assigned and completed by different functional modules in accordance with requirements, such that the internal structure of the terminal can be divided into different functional modules to complete all or part of the functions described above. In addition, the device for displaying activity record information and the method for displaying activity record information provided in the above example follow the same principal, and the specific implementation process thereof can be described in the method example and may not be described again hereto.

Figure 7:
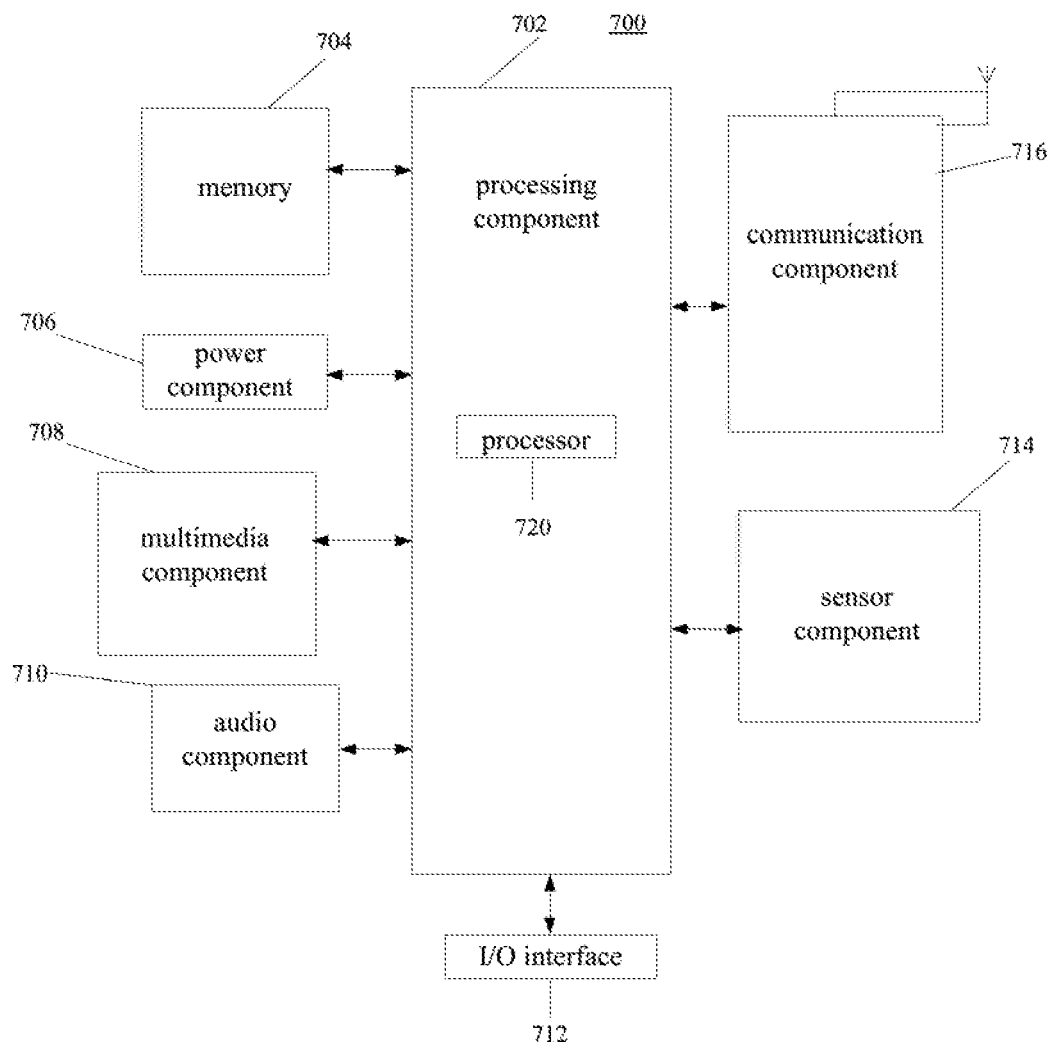
FIG. 7 is a block diagram of a terminal shown in accordance with an example.

FIG. 7 is a block diagram of a terminal shown according to an example. For example, the terminal 700 may be a mobile phone, a computer, a digital broadcast terminal, a messaging device, a gaming console, a tablet, a medical device, exercise equipment, a personal digital assistant, and the like.

Referring to FIG. 7, the terminal 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the terminal 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the terminal 700. Examples of such data include instructions for any applications or methods operated on the terminal 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the terminal 700. The power component 706 may include a power management system, one or more power sources, and any other components associated with the generation, management, and distribution of power in the terminal 700.

The multimedia component 708 includes a screen providing an output interface between the terminal 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the terminal 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the terminal 700. For instance, the sensor component 714 may detect an open/closed status of the terminal 700, relative positioning of components, e.g., the display and the keypad, of the terminal 700, a change in position of the terminal 700 or a component of the terminal 700, a presence or absence of user contact with the terminal 700, an orientation or an acceleration/deceleration of the terminal 700, and a change in temperature of the terminal 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the terminal 700 and other devices. The terminal 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for displaying activity record information.

In exemplary embodiments, there is also provided a non-transitory computer-readable storage medium including instructions, such as included in the memory 704, executable by the processor 720 in the terminal 700, for performing the above-described methods for displaying activity record information. For example, the non-transitory computer-readable storage medium may be a ROM, a RAM, a CD-ROM, a magnetic tape, a floppy disc, an optical data storage device, and the like.

In some examples, there is further provided a computer-readable storage medium including computer programs. For example, the computer-readable storage medium may be a ROM, a RAM, a CD-ROM, a magnetic tape, a floppy disk, an optical data storage device, etc. The computer programs, when executed by a processor of a terminal, cause the terminal to perform the method for displaying the activity record information in the above embodiments. The method includes: acquiring specified activity record information after switching to a specified interface; and displaying the specified activity record information in the specified interface; where the specified activity record information is obtained by a terminal from extracting and integrating the activity record information of at least one application installed in the terminal.

In some implementations, the computer-readable storage medium may further store other programs, that when executed by a processor, cause the processor to perform the alternative methods for displaying activity record information in the above examples.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for displaying activity record information, the method applicable to a mobile phone comprising a processor, the mobile phone terminal having a plurality of applications for performing activities installed therein, the method comprising:
   in response to switching to a specified interface in the mobile phone, configuring the processor to extract and integrate activity record information of all applications of the plurality of applications in an activity category to acquire specified activity record information in the activity category, wherein the activity category is determined according to a user selection; and
   displaying the specified activity record information in the activity category determined by the user selection in the specified interface in the mobile phone, wherein the specified interface is a hiboard interface; and
   wherein the specified activity record information includes a money transaction value, a money transaction time, or a money transaction name, and the specified activity record information is obtained by statistics for at least two pieces of activity record information during a specified period of time.

2. The method of claim 1, wherein before acquiring the specified activity record information, further comprising:
   determining at least one piece of activity record information, wherein each of the at least one piece of activity record information records a money transaction happening within a specified period of time;
   acquiring a money transaction value of each of the at least one piece of activity record information; and
   calculating a summation of at least one acquired money transaction value as the specified activity record information.

3. The method of claim 1, wherein displaying the specified activity record information in the specified interface comprises:
   displaying a money transaction card in the specified interface, wherein the specified activity record information is displayed in an item of information on the money transaction card.

4. The method of claim 1, further comprising:
   acquiring a show-detail instruction, wherein the show-detail instruction instructs to display details of the activity record information; and
   displaying a plurality of activity record information in items of information in a money transaction time order from a latest money transaction to an earliest money transaction, as a response to the show-detail instruction.

5. The method of claim 4, further comprising:
   displaying other activity record information other than the plurality of activity record information in a scrolling manner in the money transaction time order from the latest money transaction to the earliest money transaction, when a slide operation has been detected.

6. The method of claim 4, further comprising:
   acquiring an information deletion instruction, wherein the information deletion instruction instructs to delete any of the plurality of activity record information; and
   deleting the activity record information as a response to the information deletion instruction.

7. The method of claim 4, further comprising:
   acquiring an information modification instruction, wherein the information modification instruction instructs to modify any of the plurality of activity record information;
   displaying the activity record information in a modifiable way as a response to the information modification instruction; and
   acquiring modification information of the activity record information and updating the activity record information in accordance with the modification information.

8. The method of claim 1, further comprising:
   acquiring an information addition instruction, wherein the information addition instruction instructs to add activity record information;
   displaying an input interface as a response to the information addition instruction; and
   acquiring input information in the input interface, generating newly added activity record information in accordance with the input information, and displaying the newly added activity record information in the specified interface.

9. A mobile phone, comprising:
   a processor;
   a plurality of applications for performing activities installed in the mobile phone, and
   a memory configured to store executable instructions executed by the processor,
   wherein the processor is configured to:
   in response to switching to a specified interface in the mobile phone, extract and integrate activity record information of all applications in an activity category to acquire specified activity record information in the activity category, wherein the activity category is determined according to a user selection; and
   display the specified activity record information in the activity category determined by the user selection in the specified interface, wherein the specified interface is a hiboard interface;
   wherein the specified activity record information includes a money transaction value, a money transaction time, or a money transaction name, and the specified activity record information is obtained by statistics for at least two pieces of activity record information during a specified period of time.

10. The mobile phone of claim 9, wherein the processor is further configured to:
    determine at least one piece of activity record information that records money transactions happening within a specified period of time;
    acquire a money transaction value of each of the at least one piece of activity record information; and
    calculate at least one acquired money transaction value to obtain an accumulated money transaction value and obtain the specified activity record information.

11. The mobile phone of claim 9, wherein the processor is further configured to:
    display a money transaction card in the specified interface, wherein the specified activity record information is displayed in an item of information on the money transaction card.

12. The mobile phone of claim 9, wherein the processor is further configured to:
   acquire a show-detail instruction, wherein the show-detail instruction instructs to display details of the activity record information; and
   display a plurality of activity record information in items of information in a money transaction time order from a latest money transaction to an earliest money transaction, as a response to the show-detail instruction.

13. The mobile phone of claim 12, wherein the processor is further configured to:
   display other activity record information other than the plurality of activity record information in a scrolling manner in the money transaction time order from the latest money transaction to the earliest money transaction, when a slide operation has been detected.

14. The mobile phone of claim 12, wherein the processor is further configured to:
   acquire an information deletion instruction, wherein the information deletion instruction instructs to delete any of the plurality of activity record information; and
   delete the activity record information as a response to the information deletion instruction.

15. The mobile phone of claim 12, wherein the processor is further configured to:
   acquire an information modification instruction, wherein the information modification instruction instructs to modify any of the plurality of activity record information;
   display the activity record information in a modifiable way as a response to the information modification instruction; and
   acquire modification information of the activity record information and update the activity record information in accordance with the modification information.

16. The mobile phone of claim 9, wherein the processor is further configured to:
   acquire an information addition instruction, wherein the information addition instruction instructs to add activity record information;
   display an input interface as a response to the information addition instruction; and
   acquire input information in the input interface, generate newly added activity record information in accordance with the input information, and display the newly added activity record information in the specified interface.

17. A non-transitory computer-readable storage medium storing computer program instructions that, when executed by a processor, cause the processor to perform the acts comprising:
   in response to switching to a specified interface in a mobile phone, extract and integrate activity record information of all applications in an activity category, acquiring specified activity record information in the activity category, wherein the activity category is determined according to a user selection; and
   displaying the specified activity record information in the activity category determined by the user selection in the specified interface, wherein the specified interface is a hiboard interface;
   wherein the specified activity record information includes a money transaction value, a money transaction time, or a money transaction name, and the specified activity record information is obtained by statistics for at least two pieces of activity record information during a specified period of time.

18. The method of claim 1, further comprising determining, by the mobile phone, a target transaction page after a money transaction is completed, wherein the target transaction page is generated by one application of the plurality of applications installed on the mobile phone, and the target transaction page is related to the money transaction and the target transaction page contains the activity record information.

19. The method of claim 1, further comprising integrating the activity record information in the activity category only when the mobile phone is plugged into a power supply.

* * * * *